United States Patent [19]

Sharpe et al.

[11] 4,099,124
[45] Jul. 4, 1978

[54] COMBINED KEYED AGC AND PULSE AMPLITUDE COMPARATOR CIRCUIT

[75] Inventors: Claude A. Sharpe; Richard V. Frazier, Jr., both of Ft. Lauderdale, Fla.

[73] Assignee: The Bendix Corporation, Southfield, Mich.

[21] Appl. No.: 788,955

[22] Filed: Apr. 19, 1977

[51] Int. Cl.² ............................................. H04B 1/16
[52] U.S. Cl. .................................... 325/326; 325/400
[58] Field of Search ................. 325/321, 326, 400; 358/174, 176, 177, 178

[56] References Cited

U.S. PATENT DOCUMENTS

| 3,624,290 | 11/1971 | Hofmann | 358/178 |
| 3,740,471 | 6/1973 | Wilcox | 358/178 |
| 3,979,683 | 9/1976 | Ikeda | 358/177 |

*Primary Examiner*—Benedict V. Safourek
*Attorney, Agent, or Firm*—Bruce L. Lamb; William G. Christoforo

[57] ABSTRACT

Combined keyed AGC and pulse amplitude comparison circuit for use in pulse pair communications system such as DME wherein AGC keying signal is constituted by the second pulse having a predetermined spacing from a first pulse of a pair and wherein said second pulse also provides a reference against which the amplitude of succeeding pulses is compared. Pulses with amplitudes above said reference level are passed to a decoder for determining pulse spacing. The decoder determines which pulse pairs are properly spaced so that the second pulse of a pair can serve as a keying signal.

5 Claims, 1 Drawing Figure

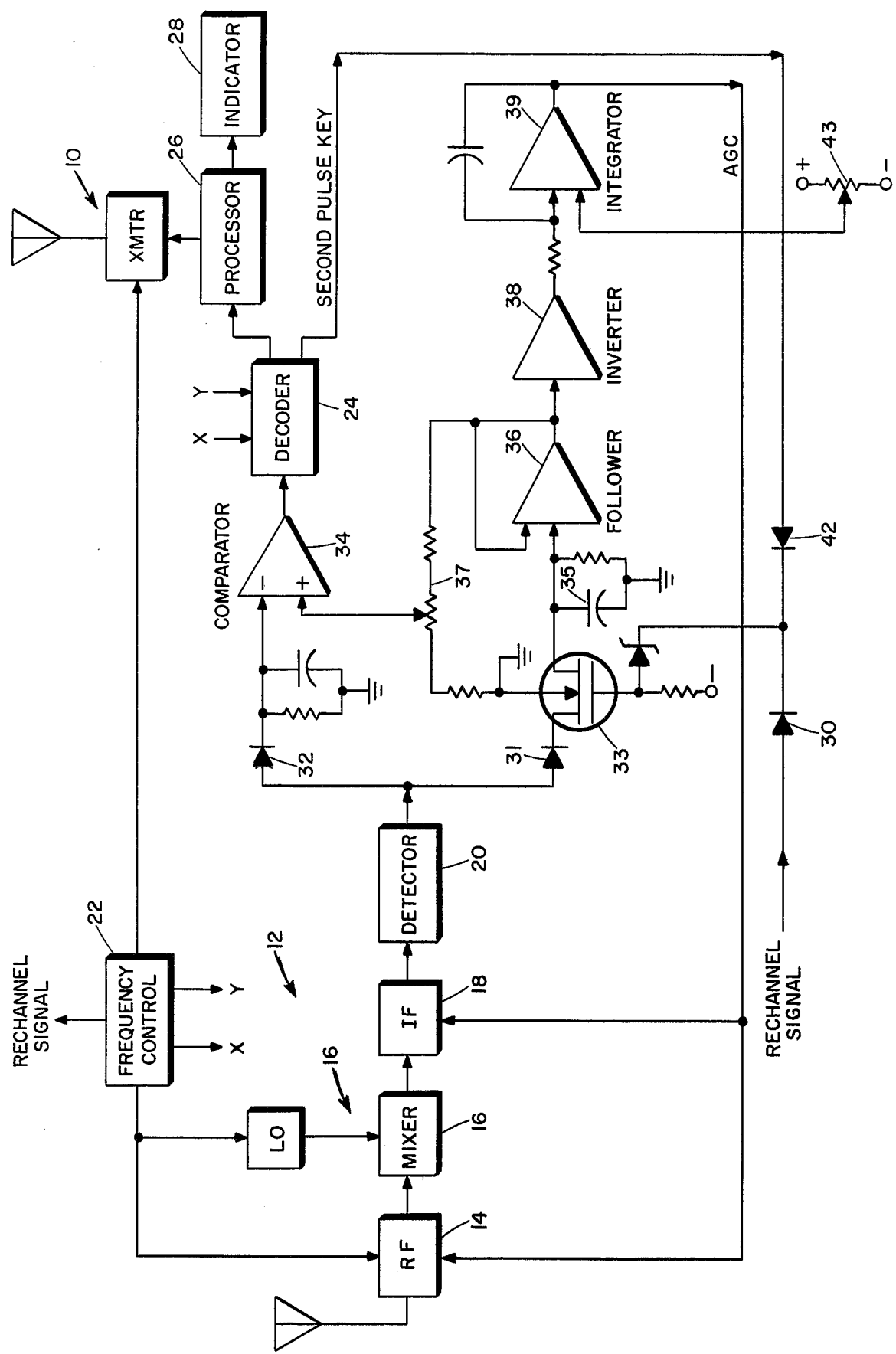

COMBINED KEYED AGC AND PULSE AMPLITUDE COMPARATOR CIRCUIT

The present invention relates to a combined keyed automatic gain control and pulse amplitude comparison circuit particularly suited for use in airborne distance measuring equipment.

Distance Measuring Equipment (DME) used for air navigation comprises an airborne interrogator and a ground based responser. Aircraft desiring an indication of the distance to a particular ground station transmit an interrogating pair of pulses to the ground responser which, after a fixed delay, replies by transmitting a pair of pulses back to the interrogating aircraft, or any other aircraft within range. Various ground stations are distinguishable from one another by the assignment of channel frequencies and by "X" or "Y" pulse spacings, more particularly, "X" and "Y" pulse spacings for air to ground transmissions are $12/\mu s$ and $36/\mu s$, respectively, while "X" and "Y" pulse spacings for ground to air transmissions are respectively $12/\mu s$ and $30/\mu s$. Since many aircraft may be simultaneously tracking their range to the same ground station or even to different stations with the same channel frequency but different pulse spacing, numerous interfering pulses are likely to be present at any time the DME in an aircraft is operating.

The presence of a large number of interfering pulses the amplitude of many of which may substantially exceed the amplitudes of desired pulses has caused stringent requirements to be set for the peformance of the DME receiver automatic gain control and pulse amplitude comparator circuits. These include a requirement that the DME receiver function in the presence of random pulses having amplitudes as great as 10 db above the level of desired signal pulses; that the receiver function in the presence of pulse pairs of improper spacing, i.e. "X" channel spacing if "Y" channel is desired and vice versa, with the amplitude of such improperly spaced pulse pairs being as great as 30 db above the minimum usable signal level for desired signals; and that when pulse pairs having the desired channel spacing are present with the amplitudes of one pulse pair being greater than the amplitudes of the other pulse pair by 8 db or more, the receiver shall respond to the stronger of the pulse pairs.

It is therefore an object of the present invention to provide an AGC circuit cooperating with an amplitude comparator circuit which will permit a receiver for pulse signals to detect pulses having amplitudes substantially below the peak amplitudes of pulses applied to the receiver.

It is another object of the invention to provide an automatic gain control circuit cooperating with an amplitude comparator circuit which will permit a receiver for pulse signals to accept only the largest pulse pair signals identified by a particular spacing and to reject other lower amplitude pulse pairs with similar spacing.

Briefly the invention comprises a keyed AGC circuit in which the keying signal is the second pulse of a pair of pulses having a particular spacing, combined with a pulse amplitude comparator in which the amplitude of a received pulse is compared with a reference level established by the amplitude of a previously received second pulse of a properly spaced pulse pair. Thus random pulses or improperly spaced pulse pairs do not enter the AGC circuit and cause the receiver sensitivity to be reduced to the point where desired pulses will not be received at a useful level. When the receiver sensitivity is adjusted to provide useful signal levels for pulse pairs of the desired spacing weaker pulse pairs of the same spacing may be present. The amplitude comparator portion of the circuit rejects any pulse having an amplitude less than a certain percentage, suitably 50%, of a previous second pulse of a properly spaced pair, thus insuring that only the strongest of properly spaced pulse pairs are utilized in the signal processing of the DME receiver.

The single figure of the drawings is a functional block diagram of the improved AGC and amplitude comparator circuit of the invention.

Referring to the drawing, a DME unit broadly comprises a transmitter which interrogates a ground-based responser (not shown) with a pulse pair having either "X" ($12/\mu s$) pulse spacing. Ground stations are assigned particular frequencies and either "X" or "Y" pulse spacings so that users may select the station desired. After a fixed delay the ground station retransmits a pulse pair with either "X" ($12/\mu s$) or "Y" ($30/\mu s$) spacing to the interrogating aircraft. The ground response is selected, amplified and detected by the receiver portion 12 of the DME unit. Receiver 12 is a superheterodyne circuit including an RF amplifier 14, local oscillator and mixer 16, IF amplifier 18 and detector 20. A frequency control 22 tunes the transmitter 10 and the RF and local oscillator stages of receiver 12 to the frequencies assigned to a selected ground station and likewise determines whether "X" or "Y" channel spacing is to be used. Passing over the circuit of the invention for the time being, output pulses from detector 20 are applied to a pulse spacing decoder 24 which is set by frequency control 22 to respond only to pulses having the spacing assigned to the selected ground station. Whenever a pulse pair with proper spacing is applied to decoder 24 a signal is transmitted therefrom to a video processor 26 which determines whether the properly spaced pulse pair is coherent with the interrogating pulse pair transmitted by transmitter 10. If coherency is determined the processor then measures the time elapsing between transmission of an interrogating signal and response by the ground station. This time interval is displayed in terms of distance by an indicator 28.

In order for such a system to operate satisfactorily the gain of the receiver 12 must be neither too high nor too low. Moreover, the optimum gain is not a fixed value since signal strengths may increase or diminish as the aircraft approaches or recedes from the ground station or the signal strength may fluctuate rapidly as a result of aircraft maneuvers. Such stringent requirements for control of the receiver gain demands the use of an automatic gain control circuit and particularly a keyed automatic gain control circuit. Keyed AGC circuits are generally used in television receivers because of their superior immunity to noise. The feature which most readily distinguishes the AGC portion of the present invention from prior keyed AGC circuits is that herein the AGC is keyed on for a sampling of signal strength only during the time that the second pulse of a valid pulse pair is being received. Since the receiver will also be subjected to pulse pairs of proper spacing but lower amplitudes, as caused for example by reflections of the responser signal, and it is desired to set the AGC magnitude in accordance with the largest amplitude present of properly spaced pulses, the same pulse which determines AGC magnitude serves as a reference against which subsequent pulse amplitudes are compared. Unless the amplitudes of these subsequent pulses exceed the reference level established by a valid preceding second pulse they are blocked by the comparator portion of the circuit of the invention and cannot enter the decoder to be recirculated back through the AGC to cause maladjustment of the magnitude of the AGC voltage.

The circuit of the invention which accomplishes the foregoing desired functions will now be described. Output of detector 20 is applied through diodes 31 and 32 to a gated FET 33 and as one input to a comparator 34. FET 33 is normally biased off but an enabling voltage is momentarily applied thereto through diode 30. This enabling voltage occurs either upon first putting the equipment into operation or upon changing the tuning thereof from one operating frequency to another. One suitable source for such signal is disclosed in U.S. Pat. 3,988,696 issued Oct. 26, 1976 to C. A. Sharpe for "Phase Lock Detector for Digital Frequency Synthesizer". With FET 33 momentarily conductive the output of detector 20 charges capacitor 35 to the peak voltage level present in the detector output. The voltage on capacitor 35 appears at the output of an operational amplifier 36 connected as a follower circuit so as to present substantially no loading on the capacitor. A voltage divider 37 connected to the output of follower 36 furnishes suitably 50% of the output voltage of the follower to comparator 34 as a reference voltage. Comparator 34 is a high gain amplifier, the output of which is cut-off or saturated according to the polarity of the algebraic sum of the amplitudes of the inputs thereto. The output of follower 36 is also inverted in an operational amplifier 38 and applied to an integrating operational amplifier 39. The output of integrator 39 constitutes the AGC voltage applied to the receiver RF and IF stages.

Initially the AGC voltage is of some transitory magnitude which will permit pulses to be detected and applied to comparator 34 through diode 32, each such pulse which exceeds in amplitude the initial reference threshold set by voltage divider 37 causes the output of the comparator to switch states and thereby generate a pulse of a polarity acceptable to decoder 24. FET 33 is by now cut off and will remain so until a properly spaced pulse pair appears at the input to decoder 24. Substantially immediately upon determining the presence of a properly spaced pulse pair, decoder 24 emits a keying signal which is applied through diode 42 to key FET 33 conductive. The valid second pulse, which still persists at the output of detector 20, is then substantially immediately conducted to capacitor 35 to charge the capacitor to the peak value of the valid second pulse. Thereafter each pulse applied to decoder 24 must exceed in amplitude the 50% level set by divider 37 of the last preceding valid second pulse. And so the operation continues with the AGC voltage magnitude and the comparator reference level being continuously updated in adjustment only upon the appearance of the second pulse of a valid pulse pair. To insure that the AGC magnitude which is present during the initial transitory period of operation is not such as to permit saturation of the receiver a bias is applied to integrator 39 from a manually adjustable potentiometer 43 connected to a constant voltage source. Also IF amplifier 18 is preferably designed with a soft limiting characteristic to provide rapid recovery from large amplitude random pulses.

Obviously the invention may be practiced other than as specifically described without departing from the spirit and scope of the appended claims.

The invention claimed is:

1. A combined keyed automatic gain control and amplitude threshold comparator circuit for use in a pulse modulated communications system wherein desired signals are distinguished, in part, from undesired signals by the existence of a predetermined spacing between pulse pairs, comprising:

a parallel circuit including two paths for pulses detected by said communications system;
 switching means in one of said paths for conducting or blocking conduction of said detected pulses therethrough;
 an amplitude comparator in the other of said paths for comparing the amplitudes of said pulses against a reference voltage applied thereto and for permitting conduction therethrough only of said pulses having amplitudes exceeding said reference voltage;
 decoding means for determining the spacing between pulses conducted by said amplitude comparator and for producing a keying signal upon the appearance of a second pulse having said predetermined spacing from a first pulse;
 means applying said keying signal to said switching means to render said switching means conductive during the persistence of said keying signal;
 means utilizing pulses conducted by said switching means for developing an automatic gain control voltage for said communications system and to provide said reference voltage to said amplitude comparator; and
 means temporarily operative for rendering said switching means conductive whereby initial transitory values of automatic gain control and reference voltages are established and thereafter such voltages are substantially wholly dependent upon the amplitude of said second pulse having a predetermined spacing from a first pulse.

2. The circuit of claim 1 wherein said means for developing an automatic gain control voltage and providing said reference voltage include;

a capacitor for receiving pulses conducted by said switching means; and
 an amplifier providing an output voltage related to the voltage to which said capacitor is charged by pulses applied thereto, said amplifier operating without significant loading on said capacitor, the output of said amplifier constituting the source of said reference voltage.

3. The circuit of claim 2 further including;

integrating means receiving output from said amplifier as one input thereto; and
 means applying a bias voltage as a second input to said integrating means, the output of said integrating means constituting said automatic gain control voltage.

4. The circuit of claim 2 wherein said amplitude comparator includes:

a second amplifier;
 means applying as a first input to said second amplifier a portion of the output of said first-named amplifier;
 means applying as a second input to said second amplifier pulses in the other of said paths;

said first and second inputs to said second amplifier each tending to drive said second amplifier into opposite states of conduction, said decoding means being responsive only to one state of conduction of said second amplifier.

5. A circuit as claimed in claim 1 wherein said communications system includes tuning means for selecting the system operating frequency and wherein said last-named means of said circuit includes;
 means for generating a rechannel signal which occurs upon altering the operating frequency of said communications system; and
 means applying said rechannel signal to said switching means to cause said switching means to become temporarily conductive.

* * * * *